United States Patent [19]

Cupples et al.

[11] 3,876,600

[45] Apr. 8, 1975

[54] DEACTIVATING REMOVING ALUMINUM AND TITANIUM CONTAMINANT FROM ZIEGLER-NATTA POLYMERIZATION MIXTURES

[75] Inventors: Barrett L. Cupples, Murrysville; Thomas J. Lynch, Harmar Township; Clarence R. Murphy, Allison Park, all of Pa.

[73] Assignee: Gulf Research & Development Company, Pittsburgh, Pa.

[22] Filed: Dec. 21, 1973

[21] Appl. No.: 427,083

[52] U.S. Cl. ........................... 260/93.7; 260/94.9 F
[51] Int. Cl. ............................ C08f 1/88; C08f 1/52
[58] Field of Search ....................... 260/93.7, 94.9 F

[56] References Cited

UNITED STATES PATENTS 2,935,499   5/1960   Albright et al.................... 260/93.7

*Primary Examiner*—William F. Hamrock

[57] ABSTRACT

A polymerization reaction product comprising a solution of a poly(1-alkene) and a hydrocarbon polymerization solvent is purified of Ziegler-Natta aluminum and titanium containing catalyst residue by treating with flux-calcined diatomite to deactivate and insolubilize the aluminum and titanium and filtering out the insolubilized aluminum and titanium.

9 Claims, No Drawings

DEACTIVATING REMOVING ALUMINUM AND TITANIUM CONTAMINANT FROM ZIEGLER-NATTA POLYMERIZATION MIXTURES

This invention relates to an improved method for removing the aluminum and titanium catalyst residue from a Ziegler-Natta polymerization reaction product containing a liquid poly(1-alkene) dissolved in a hydrocarbon solvent by deactivating the catalyst and insolubilizing the catalyst metals with flux-calcined diatomite and filtering out the aluminum and the titanium catalyst metals together with the flux-calcined diatomite from the liquid organic portion.

The polymerization of the lower 1-alkenes, particularly ethylene, propylene and 1-butene, or mixtures of 1-alkenes containing at least one of those lower 1-alkenes using a Ziegler-Natta type polymerization catalyst generally results in a solid polymer, usually as a solid dispersion in the liquid polymerization reaction medium. Heretofore, following the Ziegler-Natta polymerization of these 1-alkenes, the catalyst residue is generally deactivated or quenched. In this catalyst deactivation step a substance is added to the polymerization reaction mixture to react with and kill the residual catalyst. Filtration of the treated material separates the solid polymer together with solidified catalyst metals from the liquid filtrate and any non-filterable solids. The solid polymer is then freed of the catalyst metals in a subsequent procedure. In this deactivation procedure, the deactivating material can be water, either introduced as the liquid or as steam, an alkaline reactant such as sodium hydroxide or carbonate, a mineral acid such as hydrogen chloride, salts of organic acids such as sodium acetate, an aliphatic alcohol such as isopropyl alcohol, aliphatic ketones such as methylethyl-ketone, an aliphatic organic acid such as acetic acid, carboxylic acid esters such as ethyl acetate, and the like, and most generally a combination of two or more of these agents, each from a different chemical class.

The higher 1-alkenes, particularly those having five to 20 carbon atoms, can be polymerized in a hydrocarbon solvent using a suitable Ziegler-Natta type catalyst, particularly an organoaluminum compound in combination with a titanium salt, to produce liquid poly(1-alkenes) which are dissolved in the solvent. In order to use this liquid poly(1-alkene) product it may be desirable or necessary to remove the residual aluminum and titanium metals from the solution. A convenient procedure for removing these metals, if available, would be the conversion of these metals to insoluble forms which could be readily filtered out from the liquid poly(1-alkene) solution.

Unfortunately, we have discovered that the conventional methods which have been described for deactivating Ziegler-Natta catalysts are not generally satisfactory for deactivating the residual aluminum and titanium catalyst in the liquid poly(1-alkene) solution since they do not place these metals in a form which can be readily filtered out of the poly(1-alkene) solution. Thus, we have found that these conventional procedures generally result in substantial quantities of fines which cannot be filtered out thereby passing through the filter to contaminate the poly(1-alkene) filtrate and/or plug the filter preventing effective filtration. A common result is a cloudy or milky poly(1-alkene) product instead of the clear water-white material that is desired.

Surprisingly, we have discovered that flux-calcined diatomite can be used in small amounts as a solid quenching material both to deactivate the residual catalyst and to aid in its substantially complete removal by filtration. When the crude poly(1-alkene) reaction product is treated with the flux-calcined diatomite, the residual catalyst is deactivated and the aluminum and titanium metals appear to unite in some manner with the flux-calcined diatomite for easy conjoint separation out of the polymer solution by filtration. The resulting filtrate is a colorless, water-white, liquid poly(1-alkene) solution.

Diatomite, also known as diatomaceous earth, comprises the siliceous skeletons of countless, minute diatoms which have been deposited in rock-like formations in various parts of the earth. Flux-calcined diatomite, also called white diatomite, is a material of commerce, which is obtained from this naturally occurring material in a beneficiation procedure which includes, as the final step, the calcination of the purified and sized diatomite in a rotary kiln at about 1800°F. (982° C.) in the presence of a flux, generally sodium carbonate. Other alkali metal carbonates, bicarbonates, hydroxides, as well as the chlorides can also be employed.

For effective filtration of the deactivated polymer solution the pore openings of the filter medium must be smaller than the particles of the flux-calcined diatomite and preferably substantially smaller. The mean particle size of the flux-calcined diatomite will generally be at least about 5.5 microns and preferably the mean particle size will be at least about 10 microns and most preferably at least about 20 microns.

In the filtration of fluids, it is conventional to use as the filtering medium, a paper or cloth filter precoated with a filter aid to provide a depth to the filtration zone and thereby resist or delay plugging during filtration. When a precoat is used, it is this precoat which actually does the filtering of the particles. Clay, various diatomites and perlites, sand, cotton wastes, wood pulp, fiber glass, synthetic fibers, and the like are used as a precoating material. In order to further resist plugging of the channels in the precoat, it is also conventional to incorporate a suspension of filter aid in the solution undergoing filtration which continuously builds up a new surface on the filter medium during filtration. This filter aid can be the same material which is used to form the precoat.

The aluminum in the residual catalyst occurs as a compound which is soluble in the poly(1-alkene) solution and must be converted in the quenching operation to an insoluble form which can readily be removed by filtration. The titanium in the residual catalyst occurs both in a soluble form and as a non-soluble suspension in the poly(1-alkene) solution. The deactivation operation must convert the titanium to a form which can be filtered out together with the aluminum.

When a conventional deactivation procedure, such as for example, the water deactivation of the aluminum and titanium components in the liquid poly(1-alkene) solution or deactivation using a 10 percent sodium hydroxide solution is used, we have found that a very cloudy poly(1-alkene) filtrate results even when a five micron particle size retention filtering medium is used. When water and lime are used, we found that the filters tend to clog prematurely resulting in low filter capacities even when filter aid is used. Other conventional deactivation substances produce similar results. Notwithstanding these disappointing results, we have unexpectedly discovered a new and highly effective procedure, using a solid agent, for deactivating and insolubilizing the aluminum and titanium catalyst components, and removing these materials from the liquid poly(1-alkene) solution by filtration. We have discovered that flux-calcined diatomite can be used as the sole deactivating agent to effect removal of the aluminum and titanium catalyst metals. A surprising aspect of this discovery resides not only in the fact that this solid flux-calcined diatomite can be used to deactivate the catalyst but also that very small quantities are effective. In this invention, the flux-calcined diatomite in some manner ties up all of the aluminum and titanium in an insoluble, readily filtered form. Thus, the soluble aluminum and titanium components are converted to an inactive, solid form which can be easily filtered out. The flux-calcined diatomite also serves a dual function by depositing out on the filter as a filter aid during filtration.

A further advantage resulting in the use of the flux-calcined diatomite for the catalyst deactivation is that a high flow rate can be maintained in the filter for an extended period of time without plugging of the filter while concurrently producing a clear, water-white poly(1-alkene) filtrate. In fact, we have discovered that a high flow rate with concomitant clear filtrate occurs from the beginning of the filtration until the entire free space in the filter chamber becomes filled up with the filtration solids.

The flux-calcined diatomite for efficient quenching and catalyst removal is desirably the least amount which can result in the desired catalyst deactivation and metals removal. With this in mind, the least amount of flux-calcined diatomite which is considered to be effective is about 0.005 weight percent based on the poly(1-alkene) solution and preferably a minimum of at least about 0.02 weight percent. There is no significant benefit in using an excessive amount of the flux-calcined diatomite and such represents an added expense without compensating advantage. Additionally, when an excessive amount of the flux-calcined diatomite is used over that amount which will effect the sought after catalyst deactivation and catalyst metals removal, the filter must be cleaned of the accumulated solids more frequently.

In light of these general limits we have found that about one percent is about the maximum amount of flux-calcined diatomite which is in general conveniently used and preferably about 0.2 percent is generally the maximum desirable amount. We have found that the use of an amount of flux-calcined diatomite which is roughly equal to the weight of the catalyst used in the reaction is especially suitable.

The polymerization of 1-alkenes using an aluminum-titanium Ziegler-Natta type catalyst is well known. The improved residual catalyst deactivation and filtration procedure described herein is adapted to polymerizations in which the poly(1-alkene) product is dissolved in the polymerization solvent. Although some poly(-lower 1-alkenes) are produced as a solution of the polymer in the polymerization solvent even including some polyethylenes, the 1-alkenes having from five to 20 carbon atoms are generally the most frequently produced as liquid poly(1-alkenes). This includes the linear 1-alkenes having five to 20 carbon atoms as well as the branched 1-alkenes having the branching on the 3-carbon or higher. Typical 1-alkenes which generally result in liquid poly(1-alkenes) include 1-pentene, 3-methyl-1-pentene, 1-hexene, 1-heptene, 1-octene, 1-decene, 1-dodecene, 1-tetradecene, 1-hexadecene, 1-octadecene, 1-eicosene, and the like, and mixtures of these.

The solvent can suitably be a paraffin, cycloparaffin or aromatic hydrocarbon which is inert and which is in the liquid stage both at reaction conditions and at room temperature (20°–25° C.). The paraffins include the alkanes, such as isobutane, n-butane, n-pentane, n-hexane, n-heptane, isooctane, and the like, mixtures of alkanes, such as gasoline, kerosene, mineral white oils, decalin, highly refined lubricating oil base stocks, preferably having a 210° F. (98.8° C.) viscosity of about two to about 15 cs., and the like. The cycloparaffins include cyclohexane, methylcyclohexane, decahydronaphthalene, and the like. The aromatic solvents include benzene, toluene, xylene, and the like. The hydrocarbon solvent can suitably be between about 40 to about 90 weight percent of the total amount of solvent and 1-alkene which is used. These limits are not critical. Less than 40 percent solvent can be used provided the polymer solution can be conveniently handled and filtered. The maximum solvent content is primarily governed by the economics of handling and using large quantities of a non-functional component.

The aluminum moiety of the two-component catalyst is an organoaluminum compound having the formula $AlR_{3-n}X_n$ where $n$ is from 0 to about 2, R is alkyl having one to about 20 carbon atoms, preferably one to four carbon atoms and X is chlorine, bromine or hydrogen, preferably chlorine. Typical organoaluminum compounds include ethylaluminum trichloride, diethylaluminum chloride, diisobutylaluminum bromide, dimethylaluminum hydride, aluminum trimethyl, aluminum triethyl, aluminum triisopropyl, aluminum triisobutyl, ethylaluminum sesquichloride, diphenylaluminum chloride, dioctylaluminum bromide, and the like, and mixtures thereof.

The titanium component of the polymerization catalyst is generally associated with chlorine or bromine in a titanium salt such as titanium tetrachloride, titanium tetrabromide, titanium trichloride, titanium tribromide, and includes titanium salts mixed with an aluminum salt, as exemplified by a commercially available catalyst identified by the formula $Al_xTi_yCl_z$ wherein $x$, $y$ and $z$ have the approximate relative value 1, 3 and 12, respectively. The latter material is also frequently represented by the general formula $3TiCl_3 \cdot AlCl_3$. It is primarily the aluminum and titanium metals in the catalyst which are responsible for the polymer contamination and which are removed by the present procedures. These metals are frequently determined as ash by heating the polymer product above decomposition temperature under controlled conditions.

The aluminum and titanium compounds are desirably used in amounts such that the ratio of the gram atoms of aluminum to the gram atoms of titanium is from about 1:1 to about 10:1 and more desirably from about 1.5:1 to about 3:1. The polymerization reaction is suitably carried out using about 2.5 to about 80 mols of the 1-alkene per gram of catalyst and more suitably from about 15 to about 40 mols of the 1-alkene per gram of catalyst.

The polymerization temperature can suitably be between 35° C. and about 125° C., preferably about 100°C. to about 125° C. When hydrogen is used in the polymerization reaction for molecular weight control, it can suitably be between about 0.1 and 150 psia. (0.007 and 10.5 Kg/cm.$^2$) and preferably between about 0.5 and about 25 psia. (0.035 and 1.75 Kg/cm.$^2$). The overall pressure in the polymerization reactor can conveniently be from about one atmosphere to about 150 psia. (10.5 Kg/cm.$^2$) or higher. The temperature during the catalyst deactivation and filtration stages is limited on the low side by the flow characteristics of the poly(1-alkene) solution and on the high side by its decomposition characteristics. Generally, the temperature will be within the range of about room temperature to about 350° F. (177° C.) and preferably a temperature similar to the polymerization temperature. The pressure in the system during the quenching and filtration stages is not critical provided that the polymerization solvent is maintained in the liquid state.

The following examples are set out to illustrate the novel process of the invention and to provide a better understanding of its details and advantages.

EXAMPLE 1

A series of high molecular weight copolymers of 1-hexene and 1-octadecene were made in a 30-gallon (113.5 liter) stainless steel reactor using a solvent extracted, dewaxed, hydrotreated lubricating oil having a 210° F. (98.8°C.) viscosity of 4.1 centistokes (cs.) as the reaction medium and polymer solvent.

In a typical example 72.7 pounds (32.9 Kg.) of the oil were introduced into the reactor followed by 580 grams of a six weight percent solution of triethylaluminum in the above lubricating oil. Next 36 grams of $(TiCl_3)_3 \cdot AlCl_3$ (Stauffer Chemical Company grade AAX) were added as a slurry in about 200 ml. of the above lubricating oil. The reactor contents were brought to 240° F. (115.5° C.) at 25 psig. (1.75 Kg/cm.$^2$) total pressure under a 10 mol percent hydrogen-90 mol percent nitrogen atmosphere over a 15 minute period. A blend of 91 mol percent 1-hexene and nine mol percent 1-octadecene was charged to the reactor at a rate of one pound (454 g.) per minute for 73 minutes. The resulting reaction mixture was stirred for one hour at the reaction conditions.

EXAMPLES 2–6

A series of experiments was carried out using equal portions of the polymer solution produced in Example 1, or equivalent polymer produced by using the same conditions, materials and method to study residual catalyst deactivation and removal by filtration. Nine gallons (34 liters) of the polymerization reaction product containing the residual catalyst was charged at room temperature to a baffled ten gallon (38 liter) kettle. Care was exercised to insure that the untreated product was at no time exposed to the atmosphere, i.e., oxygen. After adding the flux-calcined diatomite and sealing the kettle, the kettle and contents were heated to 300° F. (149° C.) by passing steam through the kettle's heating jacket while the contents were well agitated. The color of the polymer solution in the kettle indicated whether sufficient flux-calcined diatomite was present. A black color indicated insufficient flux-calcined diatomite and a white color indicated a sufficient amount of this material.

The kettle's contents were then removed and filtered in a precoated filter. The filter used was an eight-inch (20.3 cm.) diameter, heated, horizontal leaf filter. This filter contained six leaves plus an additional leaf for draining the filter body after the feed to the filter was stopped. The area of each leaf was 0.305 ft.$^2$ (0.0284m$^2$) making a total area for the six leaves in parallel of 1.83 ft.$^2$ (0.17m$^2$). The filtration was carried out while the temperature of the polymer solution was between 200°–280° F. (93°–138° C.) in order to lower the viscosity and enhance the filtration rates.

In this series of experiments a glass cloth filter medium was used and 0.12 lb./ft.$^2$ (0.585 Kg/m$^2$) of a commercial calcined diatomite precoating material (Celite 535 obtained from Johns Mansville Company) was deposited on this glass cloth. The pressure across the filter in each experiment was 60 psig. (2.12 Kg/cm.$^2$).

In each example Dicalite 6000, a flux-calcined diatomite of Grefco Inc. of Los Angeles, California, having a mean particle size of 35–38 microns was used. The following concentrations of flux-calcined diatomite in weight percent were used in separate portions of the polymer solution, namely, 0.025, 0.05, 0.10, 0.15 and 0.2, respectively. In each example the residual catalyst appeared to be fully deactivated and the polymer containing filtrate was clear and was water-white. The filtration rates were excellent and the filter capacity far exceeded our observations in equivalent experiments using conventional Ziegler-Natta catalyst deactivating agents.

EXAMPLE 7

The procedures of Examples 2–6 were repeated using 0.25 weight percent of the Celite 535, a commercial calcined diatomite, as the deactivation agent. Additionally, 0.30 lbs./ft.$^2$ (1.46 Kg/m$^2$) of the Celite 535 was precoated onto the filter made from unbleached wood pulp, 0.035 inch (0.089 cm.) thick. A pressure of 75–80 psig. (5.27–5.62 Kg/cm.$^2$) was maintained across the filter. The polymer filtrate was dark yellow and was very cloudy. This established that conventional calcined diatomite is not satisfactory as a residual catalyst deactivation and insolubilizing agent.

EXAMPLE 8

A series of 37 runs was carried out in the same manner and using the same procedures and polymerization reaction product as described in Examples 2–6. These runs were carried out using as the flux-calcined diatomite Dicalite 4500, having a mean particle size of 20 to 22 microns, Dicalite 5000, having a mean particle size of 25–27 microns, or Dicalite 6000. Each was used in the amount of 0.2 weight percent. In addition, 0.2 weight percent $H_2O$ was used as a co-deactivation agent. The glass cloth filter was precoated with 0.21 lb./ft.$^2$ (1.05 Kg/m$^2$) of Fibra Flo 11C, a mixture of asbestos fibers and diatomite, obtained from Johns Mansville Company. Each nine gallon (34 liter) batch was separately run through the filter at a pressure of 60 psig. (4.22 Kg/cm.$^2$) and the solids were permitted to build up from run to run. In all runs the product was readily deactivated and filtered rapidly and cleanly to a clear, uncolored product. Filtration continued after all free space was filled with filter cake until the solids choked up the feed lines. The average filtration rate for the 37 runs was 29.5 pounds of product per hour per square foot of filter (144 Kg/hour/m$^2$).

EXAMPLE 9

Example 7 was repeated except that 0.25 weight percent $H_2O$ was used in addition to the calcined diatomite as a co-deactivation agent. The polymer filtrate was clear but distinctly yellow and not satisfactory.

EXAMPLE 10

A polymer was made from 1-hexene in a 1-heptane solvent. A two-liter resin flask was charged with 1,500 ml. heptane which had been dried with a molecular sieve, heated to a boil and purged with hydrogen at a pressure of one inch (2.54 cm.) of mercury. Following this one gram of $3TiCl_3 \cdot AlCl_3$ (Grade AAX from Stauffer Chemical Company) and one milliliter of triethylaluminum were added. Next 300 ml. of dry 1-hexene was slowly added at a controlled reaction temperature of 50° C. The slight exotherm was controlled by a cold water bath. After reacting for two and one-half hours, seven 100 ml. aliquots of this reaction mixture were removed and placed in separate, 125 ml. Erlenmeyer flasks which were filled with 10 grams of the solid material set out in Table I. These were allowed to stand for two days after shaking overnight. The polymer solution which was mixed with sand stayed black. The other samples assumed the color of the solid material. Each sample was then filtered through a five micron Teflon Millipore filter. The results are set out in Table I.

Table I

| Solid Material | Appearance of Filtrate | Turbidity, HACH[a] |
|---|---|---|
| White washed sand | opaque | 320 |
| Calcined diatomite[b] | cloudy | 131 |
| Kaolin (clay) | hazy | 140 |
| Calcined diatomite[c] | cloudy | 175 |
| Calcined perlite[d] | cloudy | 280 |
| Calcined perlite[e] | cloudy | 157 |
| Flux-calcined diatomite[f] | clear | <4 |

[a] Indicates the transmission of light through a one cm. thick sample. A value of 10 corresponds to >99 percent transmission and a value of 300 corresponds to 30 percent transmission.
[b] 5.5 – 6.5 micron mean particle size.
[c] 6.0 – 7.0 micron mean particle size.
[d] 6.0 micron mean particle size.
[e] 8.0 micron mean particle size.
[f] 8.8 – 9.4 micron mean particle size.

These examples demonstrate that the flux-calcined diatomite is an excellent residual catalyst deactivation agent and insolubilizer for substantially complete removal by filtration, even in minute amounts, of the aluminum and titanium Ziegler-Natta catalyst from the liquid Poly(1-alkene) solution. They further demonstrate that water is of no particular advantage or benefit in combination with the flux-calcined diatomite. These examples also demonstrate that related solids of equivalent particle size such as calcined diatomite, calcined perlite and kaolin are ineffective as a catalyst deactivation agent and insolubilizer as described herein.

The above described Ziegler-Natta polymerization procedures, including the ranges of conditions, proportions, and the like, are not critical and do not form a part of our invention, rather they are merely illustrative of the conventional procedures and conditions. The novel procedures described herein for deactivating residual aluminum and titanium Ziegler-Natta type catalyst are applicable to any liquid poly(1-alkene) polymerization reaction product containing the residual aluminum and titanium catalyst whether or not prepared by the conventional procedures described above.

It is to be understood that the above disclosure is by way of specific example and that numerous modifications and variations are available to those of ordinary skill in the art without departing from the true spirit and scope of our invention.

We claim:

1. A method for the deactivation and separation of residual catalyst from a solution containing a liquid poly(1-alkene) which is the reaction product of the polymerization of a 1-alkene having from five to 20 carbon atoms in a hydrocarbon polymerization solvent in the presence of a catalytic amount of an organoaluminum compound and a titanium compound which comprises the steps of adding a minor amount of a flux-calcined diatomite to the poly(1-alkene) polymerization solution and filtering out the flux-calcined diatomite and the insolubilized catalyst metals from the liquid poly(1-alkene) solution.

2. A method in accordance with claim 1 in which the flux-calcined diatomite is added in an amount of at least about 0.005 weight percent of the poly(1-alkene) solution.

3. A method in accordance with claim 1 in which the flux-calcined diatomite is added in an amount about equal to the weight of the catalyst.

4. A method in accordance with claim 1 in which the flux-calcined diatomite has a mean particle size of at least about 5.5 microns.

5. A method in accordance with claim 1 in which the flux-calcined diatomite has a mean particle size of at least about 10 microns.

6. A method in accordance with claim 1 in which the flux-calcined diatomite has a mean particle size of at least about 20 microns.

7. A method in accordance with claim 1 in which the flux-calcined diatomite is added in an amount of at least about 0.02 weight percent of the poly(1-alkene) solution.

8. A method in accordance with claim 1 in which the organoaluminum compound has the general formula $AlR_{3-n}X_n$ where $n$ is from 0 to about 2, R is alkyl having one to about 20 carbon atoms and X is chlorine, bromine or hydrogen.

9. A method in accordance with claim 8 in which $n$ is 0 and R is alkyl having one to four carbon atoms and the titanium compound is a titanium trichloride composition.

* * * * *